United States Patent
Kitamura et al.

(10) Patent No.: US 6,499,056 B1
(45) Date of Patent: Dec. 24, 2002

(54) FIRST HOST COMPUTER THROUGH A FIRST INTERFACE SENDING TO A SECOND HOST COMPUTER A MESSAGE INCLUDING INFORMATION ABOUT TRANSFER DATA WRITTEN TO A STORAGE SUBSYSTEM THROUGH A SECOND INTERFACE

(75) Inventors: Manabu Kitamura, Ebina (JP); Akira Yamamoto, Sagamihara (JP); Shigeo Honma, Odawara (JP); Kiichiro Urabe, Isehara (JP); Ikuo Uratani, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/151,583

(22) Filed: Sep. 11, 1998

(30) Foreign Application Priority Data

Sep. 16, 1997 (JP) .............................. 9-250252

(51) Int. Cl.⁷ ............................................ G06F 15/167
(52) U.S. Cl. ........................................ 709/213; 710/74
(58) Field of Search .................... 395/500.44; 360/48; 711/4, 112, 147–153; 709/213–216; 710/74

(56) References Cited

U.S. PATENT DOCUMENTS

| | | | | |
|---|---|---|---|---|
| 5,535,372 A | * | 7/1996 | Benhase et al. | ....... 395/500.44 |
| 5,701,502 A | * | 12/1997 | Baker et al. | ................... 709/1 |
| 5,758,125 A | * | 5/1998 | Misinai et al. | ......... 395/500.44 |
| 5,828,876 A | * | 10/1998 | Fish et al. | ...................... 707/1 |
| 5,852,719 A | * | 12/1998 | Fishler et al. | ............... 709/216 |
| 5,913,227 A | * | 6/1999 | Raz et al. | .................... 711/149 |
| 6,041,391 A | * | 3/2000 | Kanda et al. | ............... 711/112 |

FOREIGN PATENT DOCUMENTS

| | | |
|---|---|---|
| EP | 0617362 | 9/1994 |
| WO | 9218931 | 10/1992 |
| WO | 92/18931 | * 10/1992 |

* cited by examiner

Primary Examiner—Jeffrey Gaffin
Assistant Examiner—Ilwoo Park
(74) Attorney, Agent, or Firm—Antonelli, Terry, Stout & Kraus, LLP

(57) ABSTRACT

A first host computer writes data as an object of transfer and its location information to a storage subsystem. A second host computer reads out the data as an object of transfer which has been written to said storage subsystem on the basis of the location information thus written thereto. As a result, the data transfer between the host computers can be carried out employing the storage subsystem.

16 Claims, 13 Drawing Sheets

FIRST HOST COMPUTER THROUGH A FIRST INTERFACE SENDING TO A SECOND HOST COMPUTER A MESSAGE INCLUDING INFORMATION ABOUT TRANSFER DATA WRITTEN TO A STORAGE SUBSYSTEM THROUGH A SECOND INTERFACE

FIELD OF THE INVENTION

The present invention relates to a method of transferring data between host computers employing a storage subsystem.

BACKGROUND OF THE INVENTION

In recent years, "the down sizing" for carrying out the operations of a business, conventionally carried out in a main frame, are now being performed by a small computer such as a personal computer or a workstation. A large amount of information generated as a result of operating the business is stored in the main frame and hence there is now a need for information stored on the main frame to be accessed by a small computer too. In addition, there is also the request that by using a high speed and highly reliable backup device connected to the main frame, backup for the data of the small computer is also desired.

Conventionally, with respect to the method of transmitting data between the different operating systems, there are well known an FTP (File Transport Protocol) and a distributed database.

In the above-mentioned prior art, a host computer of interest reads out temporarily data from a storage device such as a disk storage device and the data is delivered between the host computer through a network which has a protocol common to a plurality of host computers. But, the transfer rate of the network is relatively low and hence it is difficult to obtain a sufficient transfer rate. In addition, increase in the load on the network is not preferable in terms of the system.

SUMMARY OF THE INVENTION

In the light of the foregoing, the present invention was made in order to solve the above-mentioned problems associated with the prior art, and it is therefore an object of the present invention to provide a method of transferring data through a storage device such as a disk storage device instead of the network which has been conventionally used in the data transfer between the systems.

A computer system according to the present invention includes: a first computer; a second computer; a network for communication between the first and second computers; and a storage subsystem having a plurality of interfaces which are connected to the first and second computers.

The first and second computers are mutually accessible to data in the storage subsystem. When transferring the data from the first computer to the second computer, the first computer writes the transfer data to the storage subsystem. At the same time, the first computer writes to the storage subsystem the control information, which is required to transfer the data, such as the location in the storage subsystem to which the transfer data has been written. Then, the second computer reads out the control information which the first computer has written to the storage subsystem, and also on the basis of the control information thus read out, reads out the transfer data which the first computer has written to the storage subsystem.

After having read out the transfer data, the second computer writes to the storage subsystem the control information such as the location of the transfer data which the second computer has read out from the storage subsystem. Then, the first computer reads out the control information which the second computer has written to the storage subsystem, and recognizes that the second computer has completed the operation of reading out the transfer data, and also writes both of the transfer data and the control information to the storage subsystem again. In this connection, the transfer data can be overwritten to the region of the storage subsystem as long as the second computer has already read out the data from the region of interest. By repeating this processing, the data transfer from the first computer to the second computer can be realized. In addition, when writing the transfer data to the storage subsystem in this data transfer operation by the first computer, the data can be overwritten to the region of the storage subsystem as long as the second computer has already read out the data from the region of interest. For this reason, by utilizing repeatedly the same region of the storage subsystem, even in the case where the amount of transfer data is larger than the scale of the storage regions in the storage subsystem, the data transfer can be carried out. In addition, by replacing the roles of the first and second computers with each other, the data transfer from the second computer to the first computer is realized.

In addition, the above-mentioned data transfer can also be realized by carrying out only the delivery of the control information between the first and second computers through the network.

BRIEF DESCRIPTION OF THE DRAWINGS

The above and other objects as well as advantages of the present invention will become clear by the following description of the preferred embodiments of the present invention with reference to the accompanying drawings, wherein.

DESCRIPTION OF THE PREFERRED EMBODIMENTS

The preferred embodiments of the present invention will hereinafter be described in detail with reference to the accompanying drawings.

(1) First Embodiment

Figure 1:
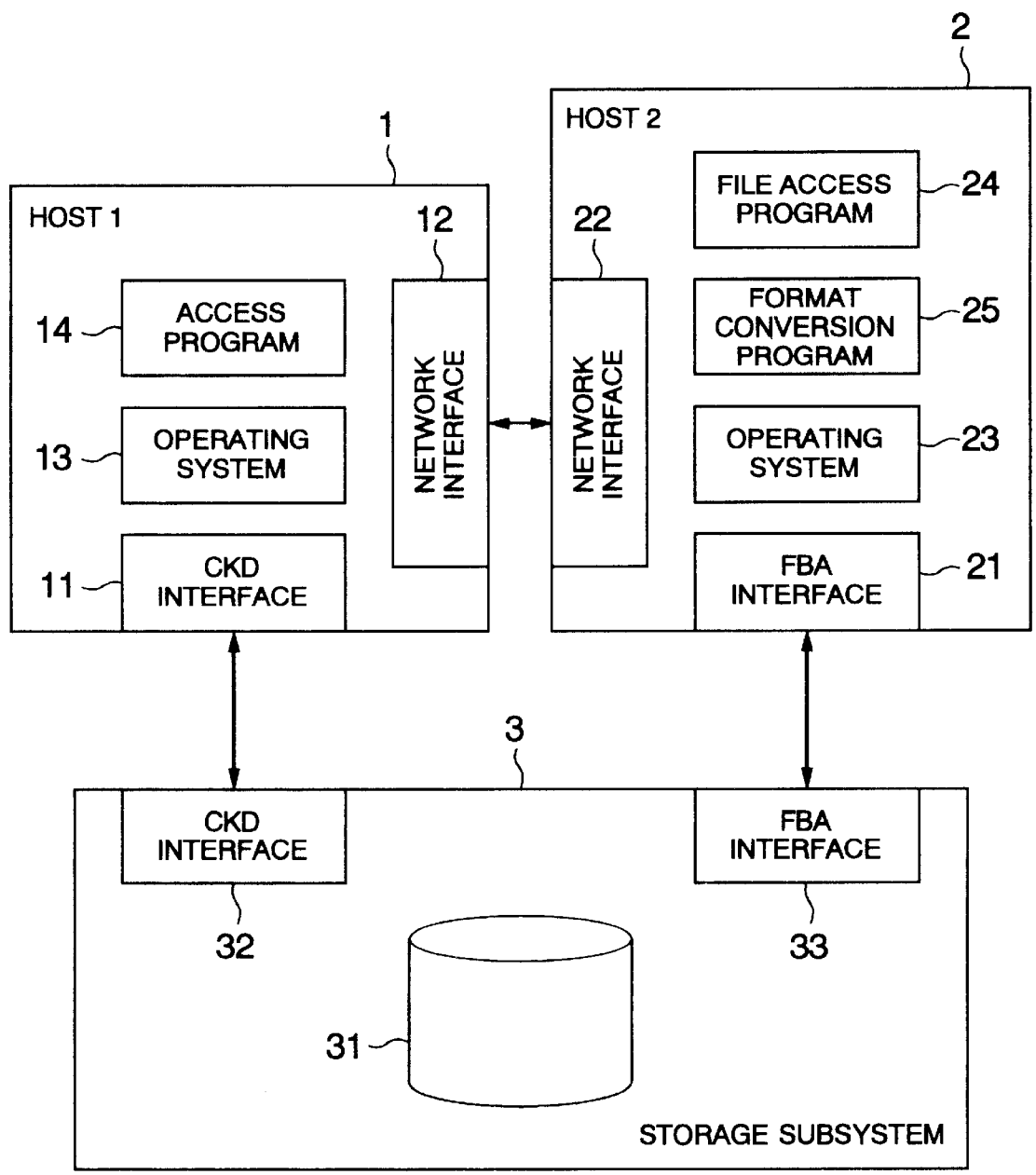
FIG. 1 is a schematic block diagram showing a configuration of a computer system in a first embodiment to which the present invention is applied.

FIG. 1 shows an example of a configuration of a computer system to which the present invention is applied. The computer system includes a host computer 1, a host computer 2 and a storage subsystem 3 which is connected to both of the host computers 1 and 2.

The host computer 1 has a count key data interface 11, which is conformed to a count key data format (hereinafter, referred to as "a CKD format" for short, when applicable), as an interface between the host computer 1 and the storage subsystem 3 and a network interface 12 through which the host computer 1 is connected to the host computer 2, and also is controlled by an operating system 13. In addition, the host computer 1 further includes an access program 14 which is executed on the operating system 13. While in addition thereto, the constituent elements such as a memory and a CPU which are necessary included in the computer are present, these elements are not important very so in the description of the present embodiment. Therefore, the description thereof is not be carried out here for the sake of simplicity.

On the other hand, the host computer 2 has a fixed length interface (FBA interface) 21, which is conformed to a fixed length block format, as an interface for connecting therethrough the host computer 2 to the storage subsystem 3, and a network interface 22 through which the host computer 2 is connected to the host computer 1, and also is controlled by an operating system 23. In addition, the host computer 2 further includes a format conversion program 25 and a file access program 24 which are executed on the operating system 23.

Both of the network interfaces 12 and 22 are the interfaces which are conformed to the same data transfer protocol.

The storage subsystem 3 includes a disk 31, a CKD interface 32 which is connected to the host computer 1, and an FBA interface 33 which is connected to the host computer 2.

In the fixed length format, each of the data is stored in the associated region called the block. Each of the blocks has the fixed length such as 512 bytes for example. A block number (hereinafter, referred to as "an LBA" for short, when applicable) is assigned to the associated block to access thereto.

On the other hand, in the CKD format, a cylinder number (CC), a head number (HH) and a record number (R) are assigned to the associated record to access thereto. The minimum unit of the access is the record. Hereinbelow, the record address which is represented by the cylinder number, the head number and the record number is called a CCHHR, and the address of the track which is represented by the cylinder number and the head number is called a CCHH. In the CKD format, one record is formed by a count portion (hereinafter, referred to as "a portion C" for short, when applicable), a key portion (hereinafter, referred to as "a portion K" for short), and a data portion (hereinafter, referred to as "a portion D" for short). The portion C has the lengths of the CCHHR, the portion K and the portion D accommodated therein and is of a fixed length type. Each of the portions K and D is of a variable length type and has the length of the data of which is recorded in the portion C. While a plurality of records collect together to form one track, since the length of the track is the fixed length, when the lengths of the records are different from one another, the number of records accommodated in one track varies depending on the individual tracks, and hence each of the records after the final record of one track becomes null. In addition, a plurality of tracks collect together to form one cylinder. In this connection, the number of tracks per cylinder is constant.

FIG. 2A shows the data arrangement on the track of the CKD format, and FIG. 2B shows the data format in the case where the data of the CKD format is stored in the storage subsystem 3 of the present embodiment. The disk 31 which is employed in the present embodiment is conformed to the fixed length data format, and after having converted the data of the CKD format into the data of the fixed length data format, the data thus obtained is stored in the disk 31.

Reference symbol HA(51) designates a home address which indicates the state and the like of the track. Reference symbol R0C(52) designates a count portion of the record 0, and reference symbol R0D(53) designates a data portion of the record 0 in which the user data can not be stored. Reference symbols R1C(54), R1K(55) and R1D(56) designate a count portion, a key portion and a data portion of the record 1, respectively. The region called a gap which has the fixed length and in which no data is stored is present between the fields to form a break therefor.

Figure 2:
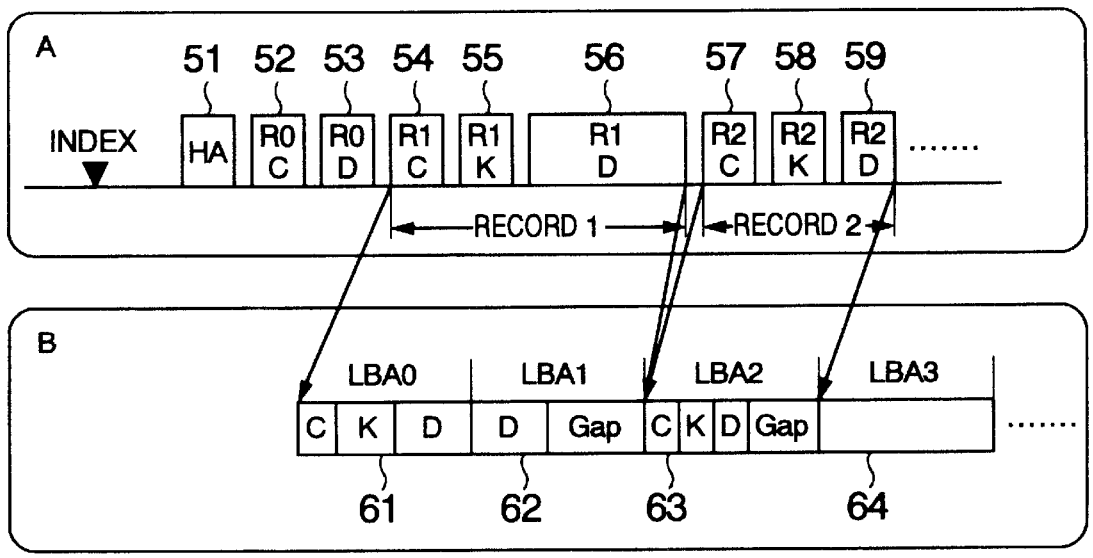
FIG. 2 is a schematic diagram useful in explaining the data of CKD format which is stored in a storage subsystem.

In the storage subsystem 3, HA(51), R0C(52) and R0D (53) of all of the tracks are collectively stored in the different region so that HA(51), R0C(52) and R0D(53) can not be viewed through the FBA interface 33. If LBA 0(61) is accessed through the FBA interface 33, then the head of the cylinder number 0, the head number 0 and the record number 1 will be accessed. In the case where the record 1 has the size which exceeds one block as shown in FIG. 2, it is continuously written to LBA 1(62) as the next block. In this connection, the gap in the record among the portions C, K and D is absent. Since the size of the record does not match necessarily the boundary between the fixed length blocks, the region extending from the end of the record to the end of the block is made null, and the record 2 starts with LBA 2(63) as the next block. 0s are arranged in all of the null portions. While the track length may not be necessarily integral multiples of the block length, in the present embodiment, it is assumed that the track length is integral multiples of the block length. In the case where the end of the record in the track does not match the end of the track, 0s are arranged up to the end of the track to form the null portions so that all of the tracks occupy the same number of blocks. For this reason, in order to access to the head of the CCHHR=(c, h, 1), the LBA can be calculated on the basis of the following expression.

$$LBA = (C \times \text{(the number of tracks in one cylinder)} + h) \times \text{the number of blocks within one track} \qquad (1)$$

Figure 3:
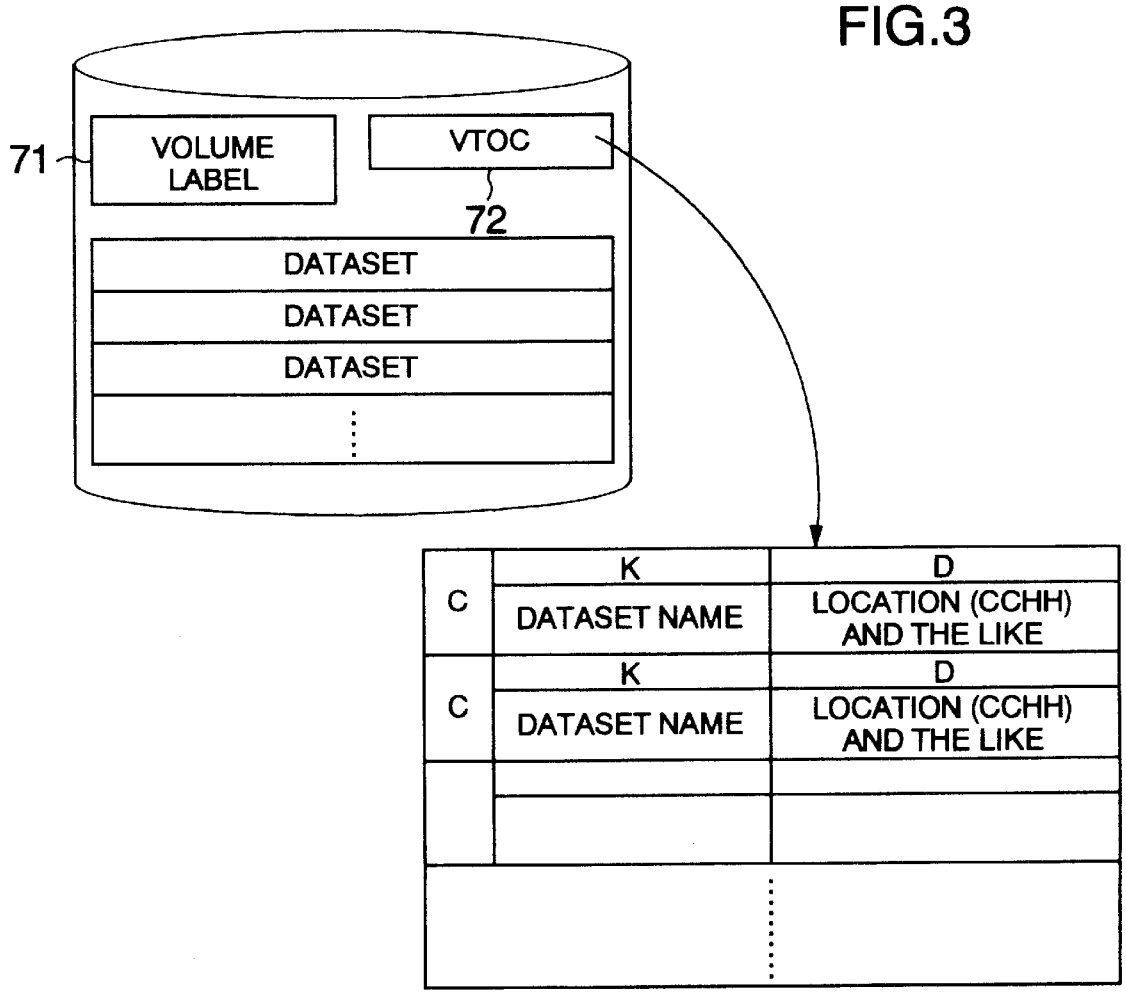
FIG. 3 is a schematic diagram useful in explaining the storage format of a dataset in a disk storage device.

FIG. 3 shows the information and the files (datasets) of the file system which the host computer 1 produces on the disk 31. A volume label 71 is stored in the specific location on the disk 31 and an address in which a VTOC (Volume Table Of Contents) 72 is written is recorded in the volume label 71. All of the management information of the datasets which are written to the disk 31 is recorded in the VTOC 72.

For example, the management information is the assembly of the records of the key portion of 44 bytes and data portion of 96 bytes. The dataset name is recorded in the key portion, and the information of the location in which the dataset is stored and the like are recorded in the data portion.

In the case where the host computer accesses to the dataset, first of all, the host computer reads out the volume label 71 and retrieves the location of the VTOC 72. Next, the host computer reads out the key portion of the record in the VTOC 72 from the record 1 successively to search for the name of the objective dataset. At the time when finding out the record in which the name of the objective dataset is recorded, the host computer reads the data portion of that record to check up the location in which the dataset of interest is stored. The dataset is recorded in the region called the extent. The extent is the continuous region in which a plurality of tracks collect together. For one dataset, one extent may be present in some cases, or a plurality of extents may be present in other cases. In the case where a plurality of extents are present for one dataset, each of the extent does not need to be present in the continuous region. Hereinbelow, it is assumed here that the dataset which is used in the data transfer is a SAM (Sequential Access Method) dataset, and the key portion is not present in the data entity.

The procedure in which the access program 14 accesses to the dataset is as follows. First of all, the dataset which becomes an object is specified to open the dataset. In the present embodiment, the record in the VTOC 72 is retrieved to check up the location of the dataset becoming an object, thereby making preparations for the access. Next, both of the relative track and the record number are given to execute the positioning processing for the record to be accessed (hereinafter, referred to as "seek" for short, when applicable). By the relative track is meant the relative track number when the head of the extent is made zero. Next, either the read processing or the write processing is carried out so that the read write can be carried out every record. In the read processing, only the data portion is read out to the host computer, while in the write processing, only by giving the host computer the contents of the data portion, the host computer can write the data of interest of the CKD format to the disk 31. After completion of the read write, finally, the dataset is closed. In the host computer 1, the processings of open, seek, read, write and close are provided by the operating system 13, and the access program 14 has only to call these processings.

The file access program 24 is also designed in such a way that similarly to the access program 14, the functions of open, seek, read and write are utilized, and the read processing and the write processing are executed every record. However, since the operating system 23 does not have the function of reading writing the data of the CKD format, a format conversion program 25 is provided between the file access program 24 and the operating system 23 in order to carry out the conversion between the CKD format and the fixed length format. The file access program 24 requests the format conversion program 25 to carry out the manipulation of the dataset.

Figure 4:
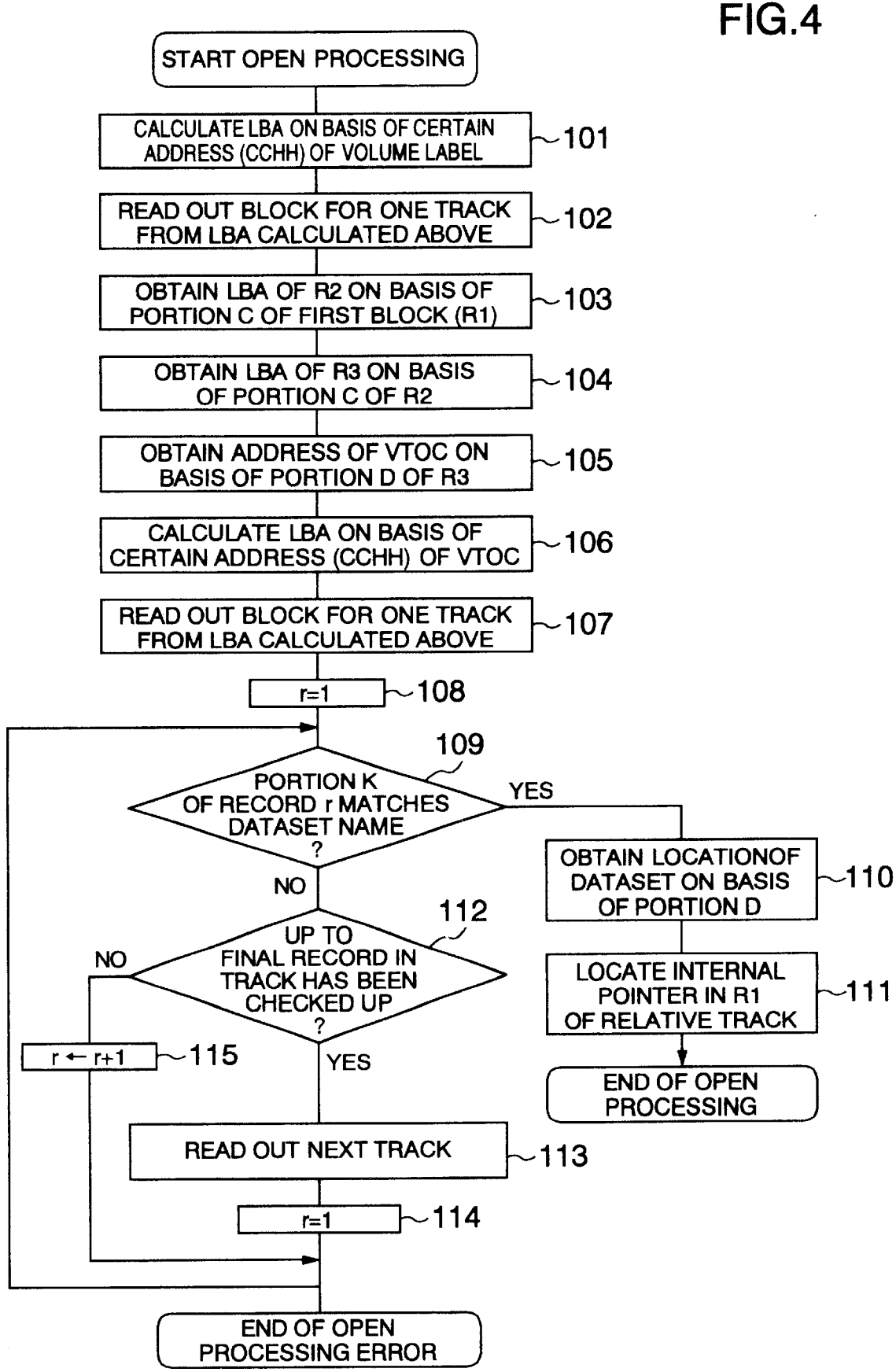
FIG. 4 is a flow chart useful in explaining the processing of opening a dataset.

FIG. 4 shows the processing which is executed by the format conversion program 25 when the file access program 24 requests the format conversion program 25 to open the dataset.

The format conversion program 25 has an internal buffer for one track and carries out the read write by utilizing the internal buffer. First of all, the format conversion program 25 reads out the volume label 71 every track. In this connection, the format conversion program 25 is previously aware of the location of the volume label 71 on the disk 31 on the basis of the CCHHR. For example, if it is assumed that the volume label 71 is present in the cylinder number 0, the head number 0 and the record number 3, then the LBA corresponding to the cylinder number 0 and the head number 0, i.e., the LBA 0 is calculated on the basis of the expression (1)(Step 101), and the block for one track is read out from that location (Step 102). Next, the lengths of the portions K and D of the record 1 are checked up on the basis of the portion C of the record 1 which is located at the head of the block thus read out so that the LBA in which the record 2 is stored is found out (Step 103). Thereafter, the head of the record 2 is read out to obtain the lengths of the portions K and D on the basis of the portion C to check up the LBA of the record 3 (Step 104). As a result, the portion D of the record 3 is found out.

Subsequently, the data relating to the location of the VTOC 72 is read out from the portion D of the record 3 (Step 105). Then, the LBA corresponding to that location is calculated on the basis of the expression (1)(Step 106) and the block for one track is read out from the LBA (Step 107). Next, a counter r is prepared and the dataset name within the VTOC 72 is retrieved. First of all, an initial value of the counter r is set to 1 (Step 108), and the key portion of the record r of the track the data of which has been read out is checked up to judge whether or not the key portion of the record r matches the name of the objective dataset (Step 109). If it is judged in Step 109 that the corresponding record is found out, then the location of the dataset is obtained from the portion D and the data relating to the location is stored in the internal variable of the format conversion program 25 (Step 110). In addition, the format conversion program 25 has an internal pointer so that it stores both of a relative track address and the record number which will be read out written at next time, and also right after completion of the open processing, the internal pointer points at the record 1 of the relative track 0 (Step 111). On the other hand, if it is judged in Step 109 that the corresponding record is not found out, then the counter r is incremented by 1 (Step 115), and the processing is returned back to Step 109 to retrieve the next record. In addition, in the case where the corresponding record is not found out even when checking up to the end of the track the data of which has been read out, the data of the next track is read out from the disk 31 and the retrieval starts with the record 1 (Steps 113 and 114).

Next, the seek processing will hereinbelow be described in detail. Right after completion of the open processing, the internal pointer of the format conversion program 25 points at the record 1 of the relative track 0. The record 1 of the relative track 0 corresponds to the head of the internal buffer. The seek processing is carried out so that the internal pointer is moved to the location of an arbitrary record within the dataset and the read write can be carried out from the location of that record. Since the file access program 24 specifies the relative track, the CCHH is calculated on the basis of the relative track and also the LBA is calculated therefrom to carry out the locating processing.

The relative track represents the relative location from the head track of the dataset. Then, if all of the extents are the continuous region, when the CCHH of the head track is (c1, h1), the relative track address TT of a certain track CCHH= (c, h) is expressed on the basis of the following expression.

$$TT = (c - c1) \times (\text{the number of tracks in one cylinder}) + h - h1 \quad (2)$$

Therefore, conversely, the CCHH can also be obtained on the basis of the relative track. While the CCHH can be obtained therefrom even if the extent is not the continuous region, in the present embodiment, for the sake of simplicity, the extent is assumed to be the continuous region.

Next, the read write processing will hereinbelow be described in detail. The format conversion program 25 has, for the read write processing thereof, an internal buffer for one track in which the contents of the dataset can be stored for one track. In addition, the internal pointer holds, in addition to the relative track address and the record number of the dataset becoming an access object, an access position of the internal buffer corresponding to the record number of interest (hereinafter, the access position will be referred to as "a buffer pointer" for short, when applicable).

Figure 5:
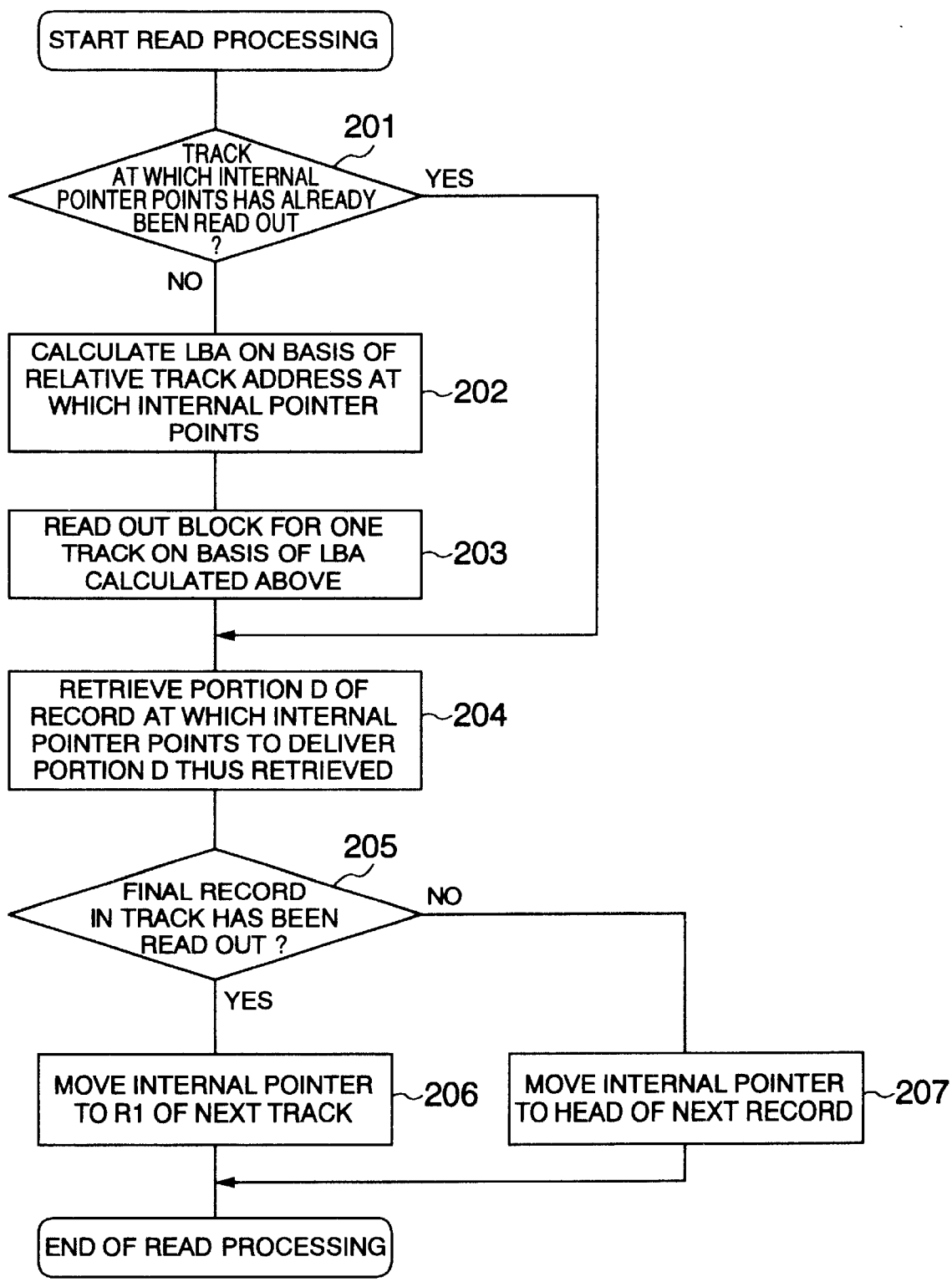
FIG. 5 is a flow chart useful in explaining the processing of reading out a dataset.

The read processing will hereinbelow be described in detail with reference to FIG. 5. At the time when having received the read request, it is checked whether or not the data of the track at which the internal pointer points has already been read out (Step 201). If it is judged in Step 201 that the data of that track is not yet read out, then the CCHH is calculated on the basis of the relative track at which the internal pointer points, and then the LBA is calculated (Step 202). In Step 203, the block for one track is read out from the LBA which has been calculated in Step 202 and then is stored in the internal buffer. On the other hand, if it is judged in Step 201 that the data of that track has already been read out, then the processings of Steps 202 and 203 are not executed. Next, the portion C of the record is skipped over and only the portion D is retrieved to be delivered to the file access program 24 (Step 204), and then the internal pointer is moved to the next record (Step 207). At the same time, the buffer pointer is also moved to the next record. The head of the next record can be calculated on the basis of the portion C of the current record. If the data has been read out up to the final record in the track, then the internal pointer is moved to R1 of the next track (Steps 205 and 206).

Figure 6:
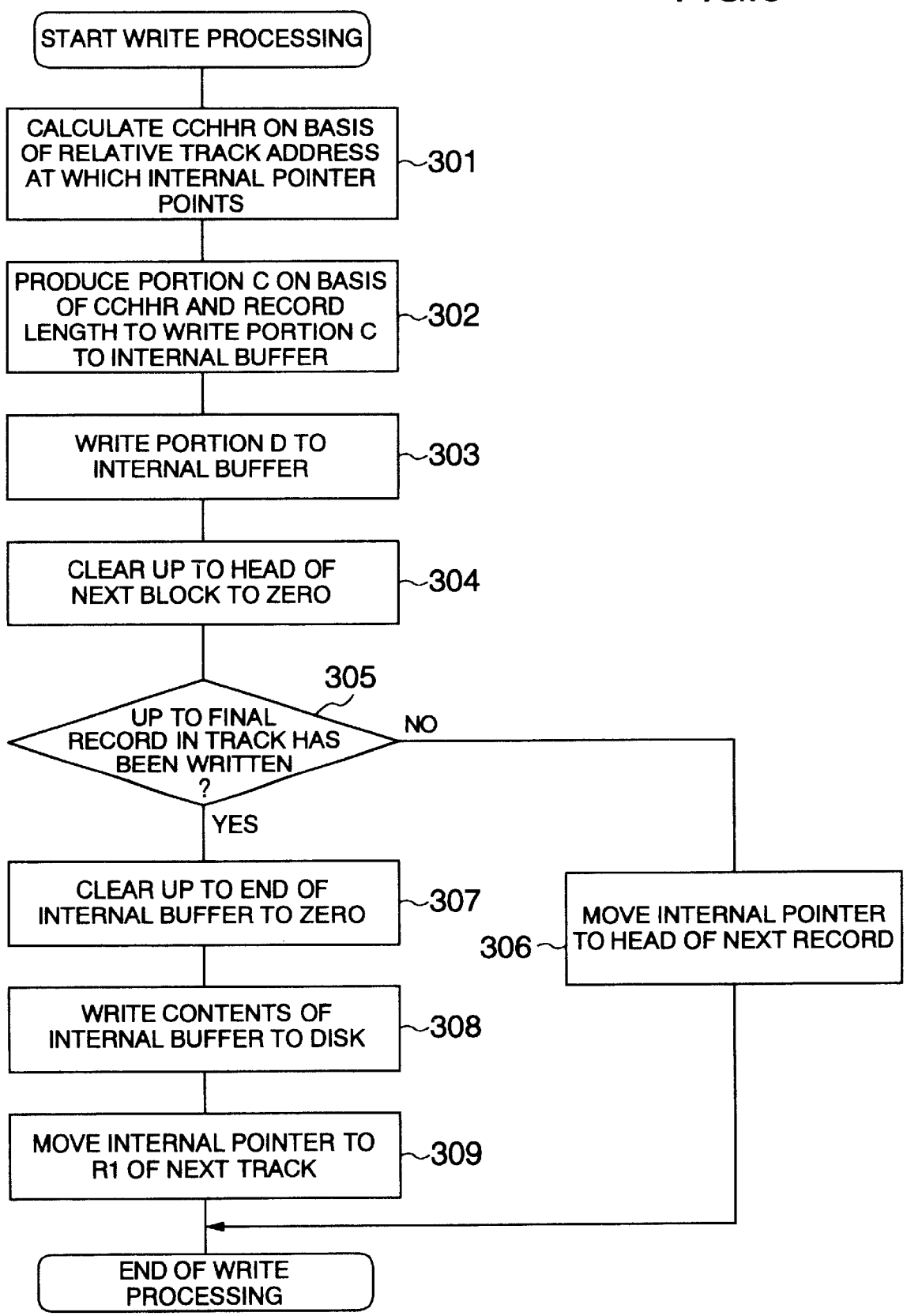
FIG. 6 is a flow chart useful in explaining the processing of writing a dataset.

In addition, in the write processing, the contents of the CKD format for one track are produced in the internal buffer and the processing of writing the data to the disk 31 is carried out in units of one track. Now, the write processing will hereinbelow be described in detail with reference to FIG. 6. Since both of the data length and the contents of the data are delivered from the file access program 24, the information which will be written to the portion C can be produced on the basis of the relative track, the record number and the record length the data of which are all stored in the internal pointer. In the write processing, first of all, the CCHHR is calculated as the information of the portion C (Step 301), and the portion C is produced on the basis of the CCHHR and the data length to be written to the internal buffer (Step 302), and then the data which has been delivered thereafter is written to the internal buffer (Step 303). Since the next record starts with the head of the next block, if the data does not reach the end of the block, then up to the head of the next block is cleared to zero (Step 304).

In Step 305, it is judged whether or not the next record can be written to the current track. While in the case of the variable length record format, this judgement is difficult to be carried out, it is assumed that the dataset which is used in the present embodiment is the fixed length record. If it is judged in Step 305 that the next record can be written to the current track, then the internal pointer is moved to the head position of the next record (Step 306). On the other hand, if it is judged in Step 305 that the next record can not be written to the current track, then the contents from the current write position in the internal buffer to the final block of the track are cleared to zero (Step 307), and then the contents of the internal buffer are written to the disk 31 (Step 308). Thereafter, the internal pointer is moved to the record 1 of the next track (Step 309).

Next, the description will hereinbelow be given with respect to the processing of transferring the data from the host computer 1 to the host computer 2.

In the present data transfer processing, the three datasets are assigned to be used in the host computer 1. In the present embodiment, these datasets are assumed to be the SAM datasets which are assigned on the host computer 1 side.

One of them is used to store the transfer data when transferring the data from the host computer 1 to the host computer 2 or from the host computer 2 to the host computer 1, and the dataset name thereof is assumed to be BUFFER. The remaining two datasets are the datasets which are used to synchronize the host computer 1 and the host computer 2 with each other, and the dataset names thereof are assumed to be SYNC 1 and SYNC 2, respectively.

Figure 7:
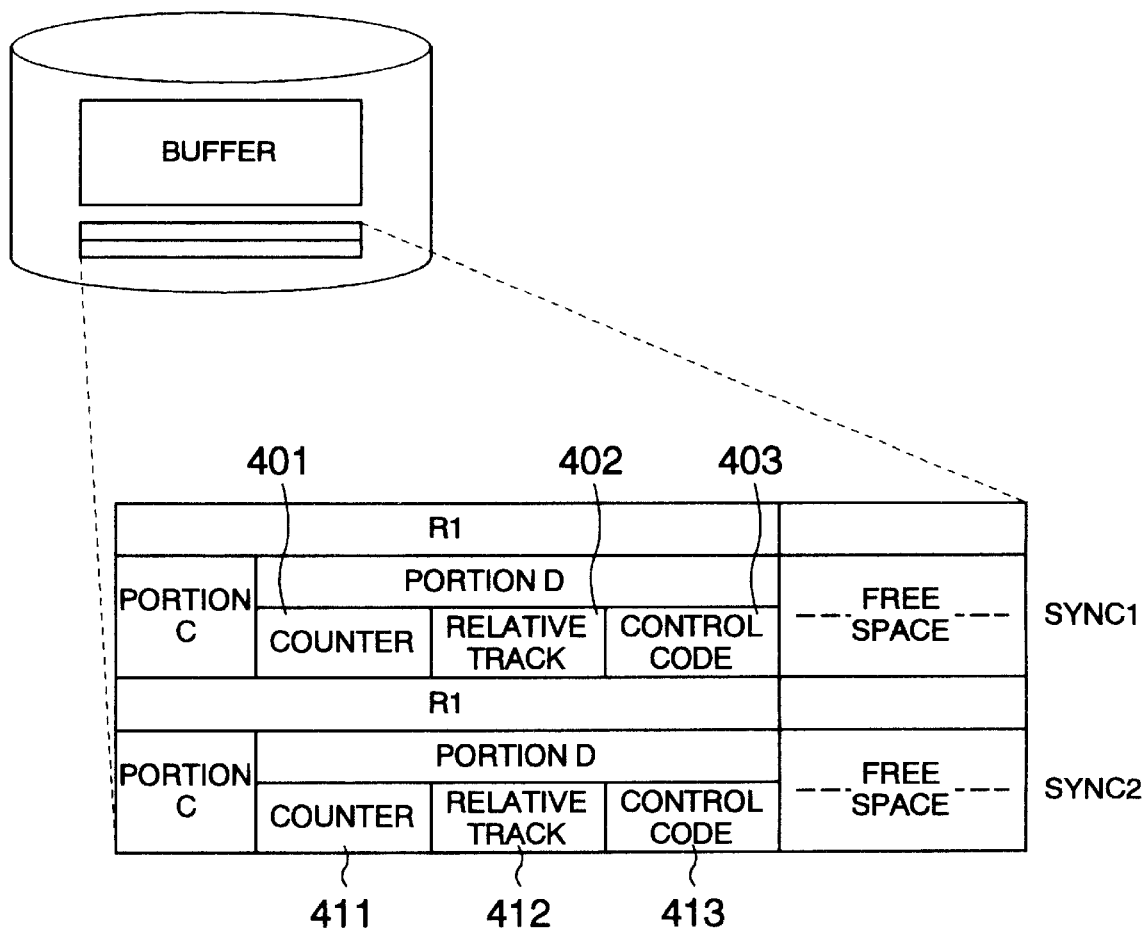
FIG. 7 is a schematic diagram useful in explaining the contents of datasets SYNC 1 and SYNC 2.

FIG. 7 shows the contents of SYNC 1 and SYNC 2. Each of SYNC 1 and SYNC 2 is the dataset for only one track. The host computer 1 writes a set of "a counter 401, a relative track 402 and a control code 403" to the record 1 of SYNC 1, while the host computer 2 controls the data transfer while referring thereto. Similarly, a set of "a counter 411, a relative track 412 and a control code 413" are prepared for SYNC 2 to be written to the record 1 of SYNC 2 by the host computer 2, and the host computer 1 controls the data transfer while referring thereto. While those may be recorded in the different records, respectively, in the present embodiment, it is assumed that those are all recorded in the data portion of the record 1, and the access program 14 and the file access program 24 read out the data in the portion D of the record 1 to retrieve the respective values. Those datasets are not necessarily present in the same disk 31, and hence they may be present separately in the two disks.

Now, the description will hereinbelow be given with respect to the procedure of transferring the data from the host computer 1 to the host computer 2 with reference to FIGS. 8 and 9. In this connection, before executing the data transfer processing, the datasets of BUFFER, SYNC 1 and SYNC 2 are previously produced in the host computer 1.

For the data transfer processing, the access programs of the host computers 1 and 2 are used. First of all, the description will hereinbelow be given with respect to the flow of the access program 14 on the host computer 1 side with reference to FIG. 8.

The access program 14 has the copies of the counter 401 and the relative track 402 of SYNC 1 on the memory in order to use them in the condition judgement. Hereinafter, the copy of the counter is referred to as "C" for short, and the copy of the relative track is referred to as "T" for short.

First of all, the access program 14 initializes the contents of SYNC 1 (Step 501). Since the host computer 1 can carry out directly the read write in the form of the CKD format, the host computer 1 may open SYNC 1 to write the initialized contents of SYNC 1 to the record 1 of the relative track 0. In the state in which the contents of SYNC 1 is initialized, 1, 0 and 0 are recorded in the counter 401, the relative track 402 and the control code 403, respectively. When the initialization has been completed, SYNC 1 is closed.

In Step 502, C and T are initialized to 1 and 0, respectively.

Next, the host computer 2 is informed through the network interface 12 of that the data transfer has been started (Step 503). At the time when having received that information sent thereto, the access program 24 on the host computer 2 side starts the reception. Then, the host computer 1 waits for the response to be returned back thereto (Step 504). At the time when the response from the host computer 2 has been received, the actual data transfer is started between the host computers 1 and 2.

In Step 505, BUFFER is opened. Next, the position of the relative track T is seeked to write the data for one track thereto (Step 506). While the unit of writing data in the host computer 1 is the record, the write is executed for the number of records corresponding to one track to write the data.

Next, the contents of SYNC 1 are updated (Step 507). In this connection, the update of SYNC 1 is carried out in such a way that SYNC 1 is opened, the values of the counter 401 and the relative track 402 of the record 1 are updated to T and L, respectively, the control code of zero is written, and after completion of the writing processing, SYNC 1 is closed.

Next, SYNC 2 is read out (Step 508). In this connection, the read of SYNC 2 is carried out in such a way that SYNC 2 is opened, the record 1 is read out and then SYNC 2 is closed. In Step 510, it is judged whether or not the write can be made for the next block. Since the data relating to up to which location of BUFFER the host computer 2 has read out is recorded in SYNC 2, the counter and the relative track of SYNC 2 are compared with the C and the T, respectively, in order to judge whether or not the write can be made for the next track. With respect to the judgement, if it is assumed that the counter of SYNC 2 is C2 and the relative track thereof is T2, when the relation of C=C2 or C>C2 and T<T2 is established, the write can be made for the next track.

If it is judged in Step 510 that the write can not be made therefor, then the sleep is carried out for a fixed time period (Step 509), and then the processing is returned back to Step 508 in which SYNC 2 is read out again and then the above-mentioned judgement is carried out in Step 510. In this connection, alternatively, even in the case where SYNC 2 is directly read out without carrying out the sleep in Step 509, there is particularly no problem.

If it is judged in Step 510 that the write can be made therefor, T is incremented by 1 (Step 511). If T exceeds the final track of BUFFER (Step 512), then T is decremented by 1 to be restored to 0 and C is incremented by 1.

In Step 514, it is judged whether or not the transfer data still remains in the access program 14. If it is judged in Step 514 that the transfer data still remains in the access program 14, then the processing is returned back to Step 506 and then the data transfer is carried out. On the other hand, if it is judged in Step 514 that the transfer data remains in the access program 14 no longer, then BUFFER is closed (Step 516), and then it is written to SYNC 1 that the file transfer has already been completed (Step 516), thereby completing the data transfer processing on the host computer 1 side. In this connection, in Step 516, the control code is changed into 1, and for the counter 401 and the relative track 402, C and T are written thereto as they are. On the host computer 2 side, SYNC 1 is read out. Then, if the control code is 1, then it is judged that the data transfer on the host computer 1 side has been completed.

Next, the description will hereinbelow be given with respect to the flow of the file access program 24 on the host computer 2 side with reference to FIG. 9. Similarly to the access program 14, the file access program 24 also holds the copies of the counter portion and the relative track portion of SYNC 2 on the memory. Then, on and after will be used in the condition judgement, the count portion of SYNC 2 is referred to as "C2" for short, and the relative track portion thereof is referred to as "T2" for short.

The file access program 24 waits for the information from the host computer 1 through the network interface 22 on the host computer 2 at all times, and continues to wait therefor if there is yet no information therefrom (Step 601). At the time when has received the information from the host computer 1, the data reception processing on the host computer 2 side is started. In Step 602, the contents of SYNC 2 are initialized. In the state in which the contents of SYNC 2 are initialized, 1, 0 and 0 are recorded in the counter 411, the relative track 412 and the control code 413, respectively. In this connection, the update method is the same as that in the data transfer processing on the host computer 1 side. Subsequently, 1 and 0 are recorded in C2 and T2, respectively (Step 603). Thereafter, in Step 604, the host computer 1 is informed through the network interface 22 of that the data reception has been started, and then in Step 605, BUFFER is opened in order to make provision for the data reception. In actual, the open processing is executed by the format conversion program 25.

In Step 606, the record 1 of SYNC 1 is read out to check up the values of the counter and the relative track. As a result, the host computer 1 can be aware of up to which track of BUFFER the write has been made. In Step 608, it is judged whether or not the position of the relative track address represented by T2 can be read out with the data thereof. If it is assumed that the counter of SYNC 1 is C1 and the relative track thereof is T2, with respect to the judgement, when the relation of C1=C2 and T1>T2, or C1>C2 is established, the read can be made. If it is judged in Step 608 that the read can not be made, then the sleep is carried out for a fixed time period (Step 607), and then the processing is returned back to Step 606 in which SYNC 1 is read out again, and then in Step 608, the judgement is carried out again. In this connection, even though the sleep in Step 607 is not necessarily carried out and alternatively SYNC 2 is immediately read out, there is particularly no problem.

If it is judged in Step 608 that the data in the position of the relative track address represented by T2 can be read out, then the contents of the relative track address represented by T2 are read out from the record 1 (Step 609). As described above, this read processing is carried out by the format conversion program 25, and only the portions D of the record 1, the record 2, . . . are delivered to the file access program 24. Next, the contents of SYNC 2 are updated (Step 610). In this connection, the contents of SYNC 2 can be updated by substituting T2 for the relative track and also by substituting the contents of C2 for the count portion.

In Step 611, T2 is incremented by 1. If T2 exceeds the final track of BUFFER (Step 612), then T2 is restored to 0 and C2 is incremented by 1 (Step 613).

In Step 614, it is judged whether or not the host computer 2 has already read out all of the data which the host computer 1 was written to BUFFER. On the host computer 2 side, if it is found that the control code is 1 as a result of reading out SYNC 1, then it is judged that the data transfer on the host computer 1 side has been completed.

If it is judged in Step 614 that the host computer 2 has not yet read out all of the data which the host computer 1 was written to BUFFER, then the processing is returned back to Step 606. On the other hand, if it is judged in Step 614 that all of the data has already been read out, the processing is returned back to Step 601 in which the file access program 24 waits for the transmission request from the host computer 1 to be sent thereto again.

In this connection, while in the present embodiment, the write of data to BUFFER and the read of data from BUFFER are carried out in units of one track, the update intervals of SYNC 1 and SYNC 2 may be changed in such a way that after a plurality of tracks are collectively transferred, or the host computer has written read several tracks to from BUFFER, the contents of SYNC 1 and SYNC 2 are updated.

Figure 8:
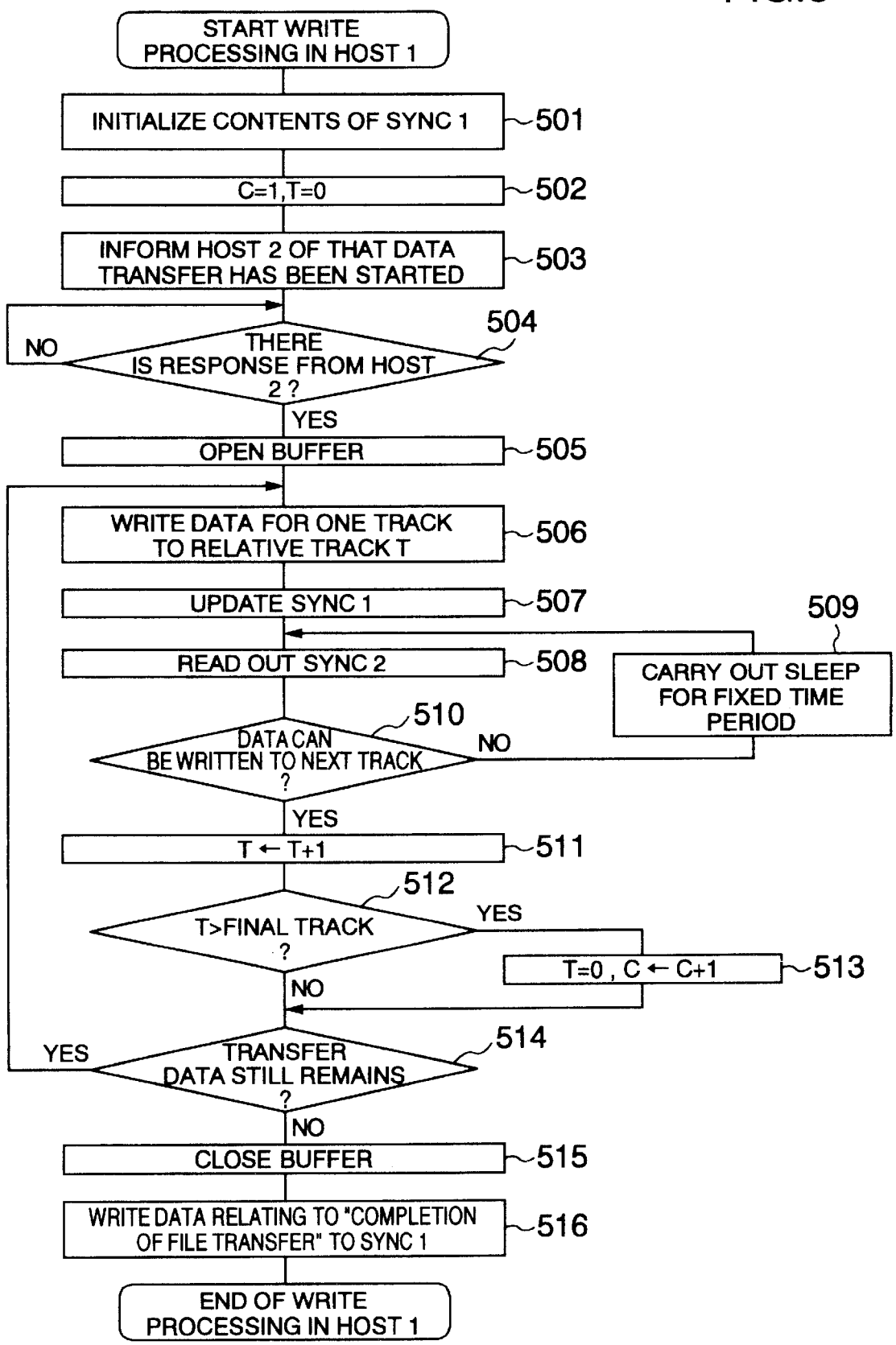
FIG. 8 is a flow chart useful in explaining the processing of transmitting data on a host 1 side in the first embodiment.
Figure 9:
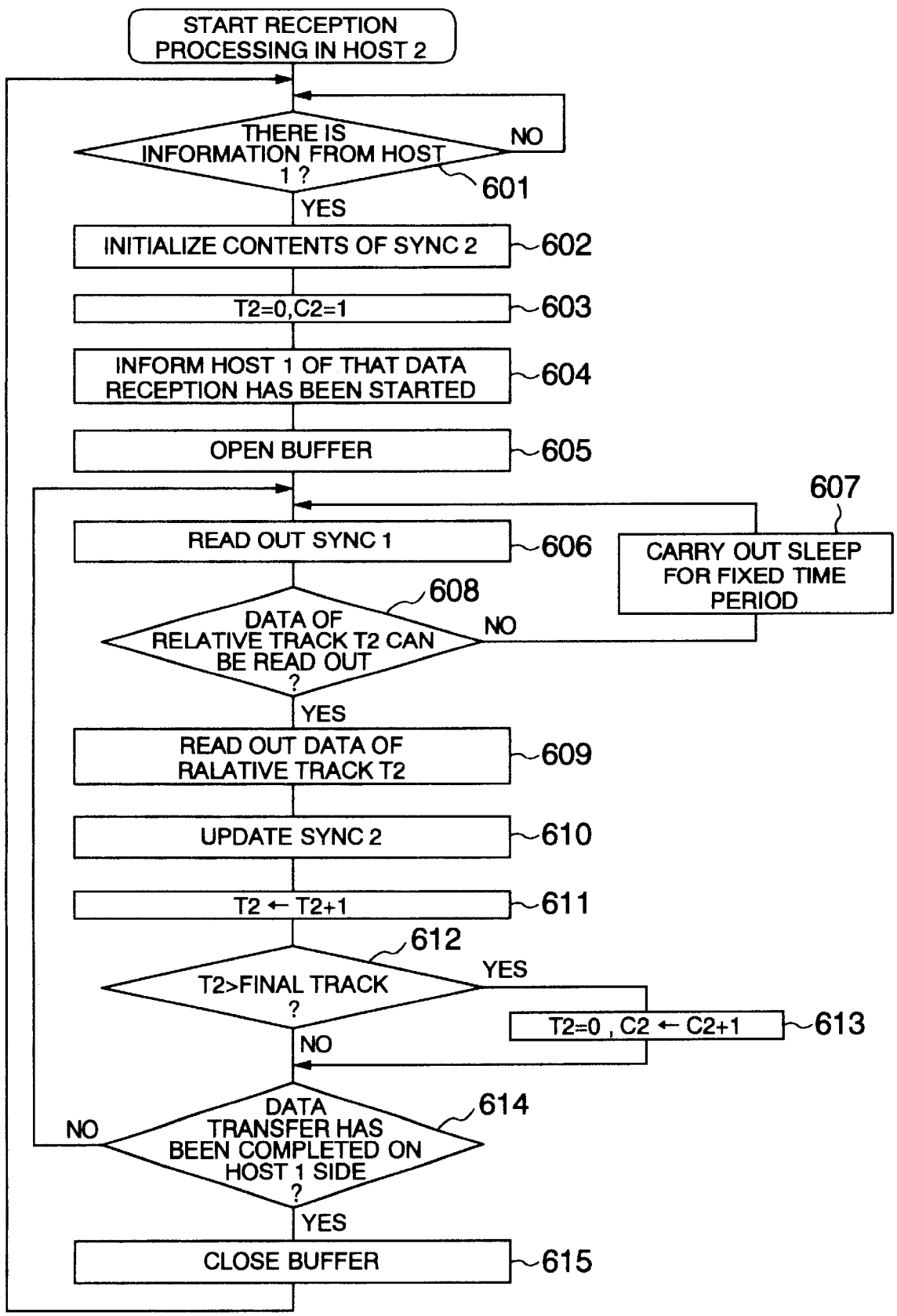
FIG. 9 is a flow chart useful in explaining the processing of receiving data on a host 2 side in the first embodiment.

In addition, while in the present embodiment, there is shown only the data transfer from the host computer 1 to the host computer 2, in the case of the data transfer from the host computer 2 to the host computer 1, if the transmission processing of FIG. 8 is executed on the host computer 2 side and also the reception processing of FIG. 9 is executed on the host computer 1 side, then the same data transfer can be realized. The differences between the fixed length data format and the data format of the CKD are absorbed by the format conversion program 25 of the host computer 2.

(2) Second Embodiment

Figure 10:
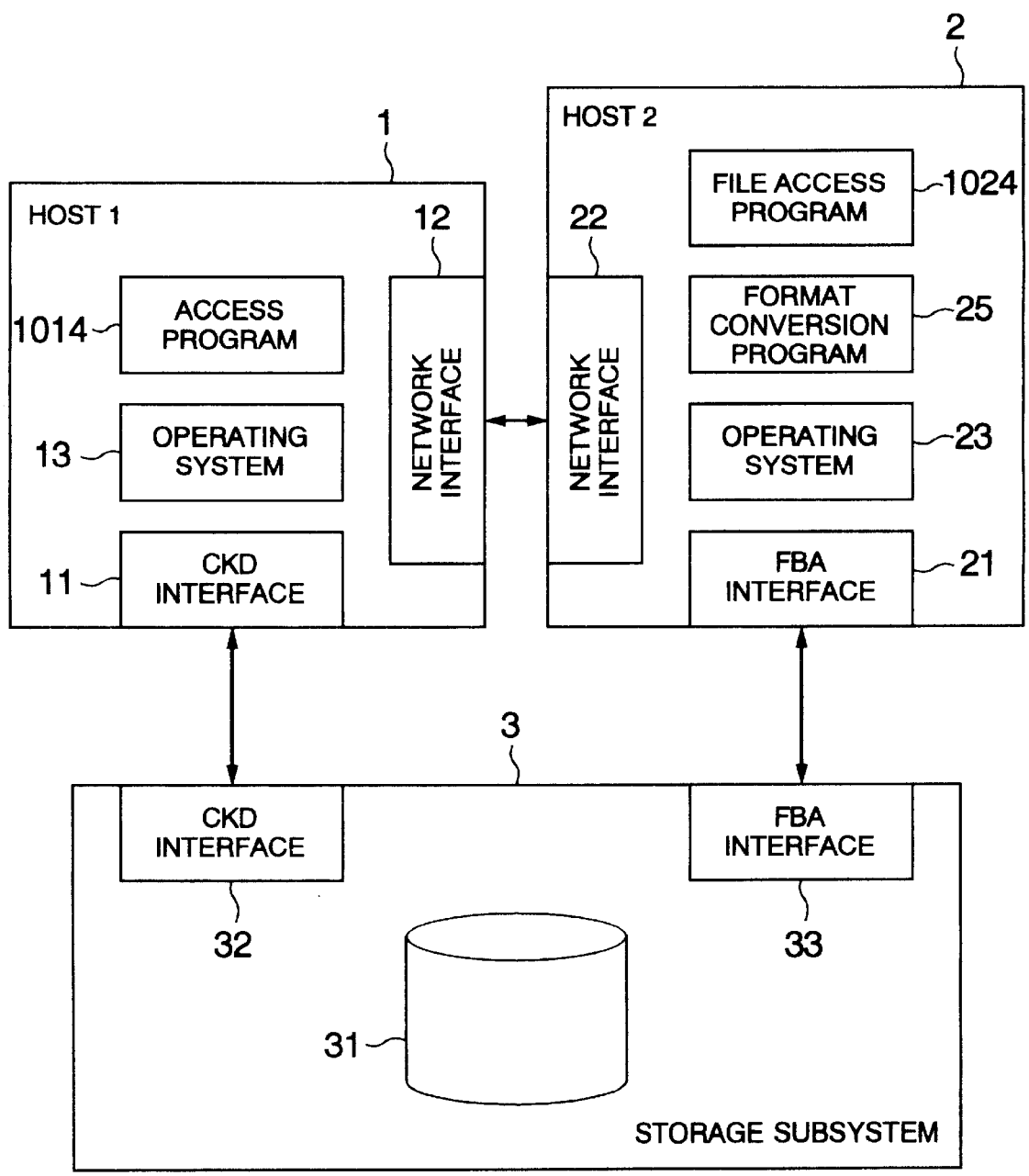
FIG. 10 is a schematic block diagram showing a configuration of a computer system in a second embodiment to which the present invention is applied.

FIG. 10 shows an example of a configuration of a computer system to which the present invention is applied. Similarly to the above-mentioned first embodiment, the computer system of the present embodiment includes a host computer 1, a host computer 2 and a storage subsystem 3 which is connected to both of the host computers 1 and 2.

The host computer 1 has a count key data interface 11, which is conformed to a count key data format (hereinafter, referred to as "a CKD format" for short, when applicable), as an interface between the host computer 1 and the storage subsystem 3, and a network interface 12 through which the host computer 1 is connected to the host computer 2, and also is controlled by an operating system 13. In addition, an access program 1014 is included in the host computer 1 and is executed on the operating system 13. In this connection, while in addition thereto, the constituent elements such as a memory and a CPU which are necessarily included in the computer, these elements are not important very so in the description of the present embodiment. Therefore, the description thereof is not carried out here for the sake of simplicity.

On the other hand, the host computer 2 has an FBA interface 21, which is conformed to a fixed length block format, as an interface for connecting therethrough the host computer 2 to the storage subsystem 3, and a network interface 22 through which the host computer 2 is connected to the host computer 1, and also is controlled by an operating system 23. In addition, the host computer 2 further includes a format conversion program 25 and a file access program 1024 which are executed on the operating system 23.

Both of the network interfaces 12 and 22 are the interfaces which are conformed to the same data transfer protocol.

The storage subsystem 3 includes a disk 31, a CKD interface 32 which is connected to the host computer 1, and an FBA interface 33 which is connected to the host computer 2.

Figure 11:
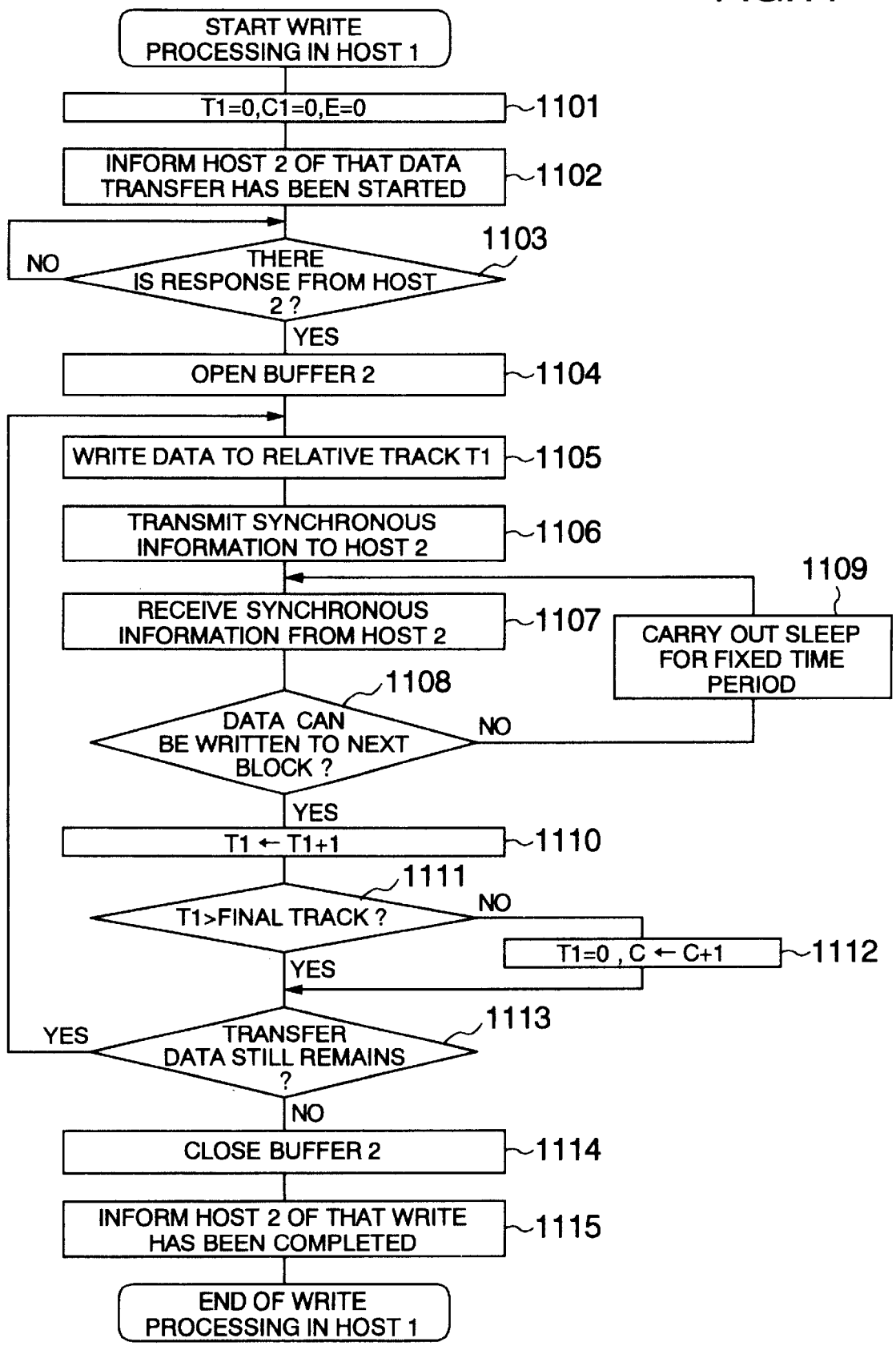
FIG. 11 is a flow chart useful in explaining the processing of transmitting data on a host 1 side in the second embodiment.
Figure 12:
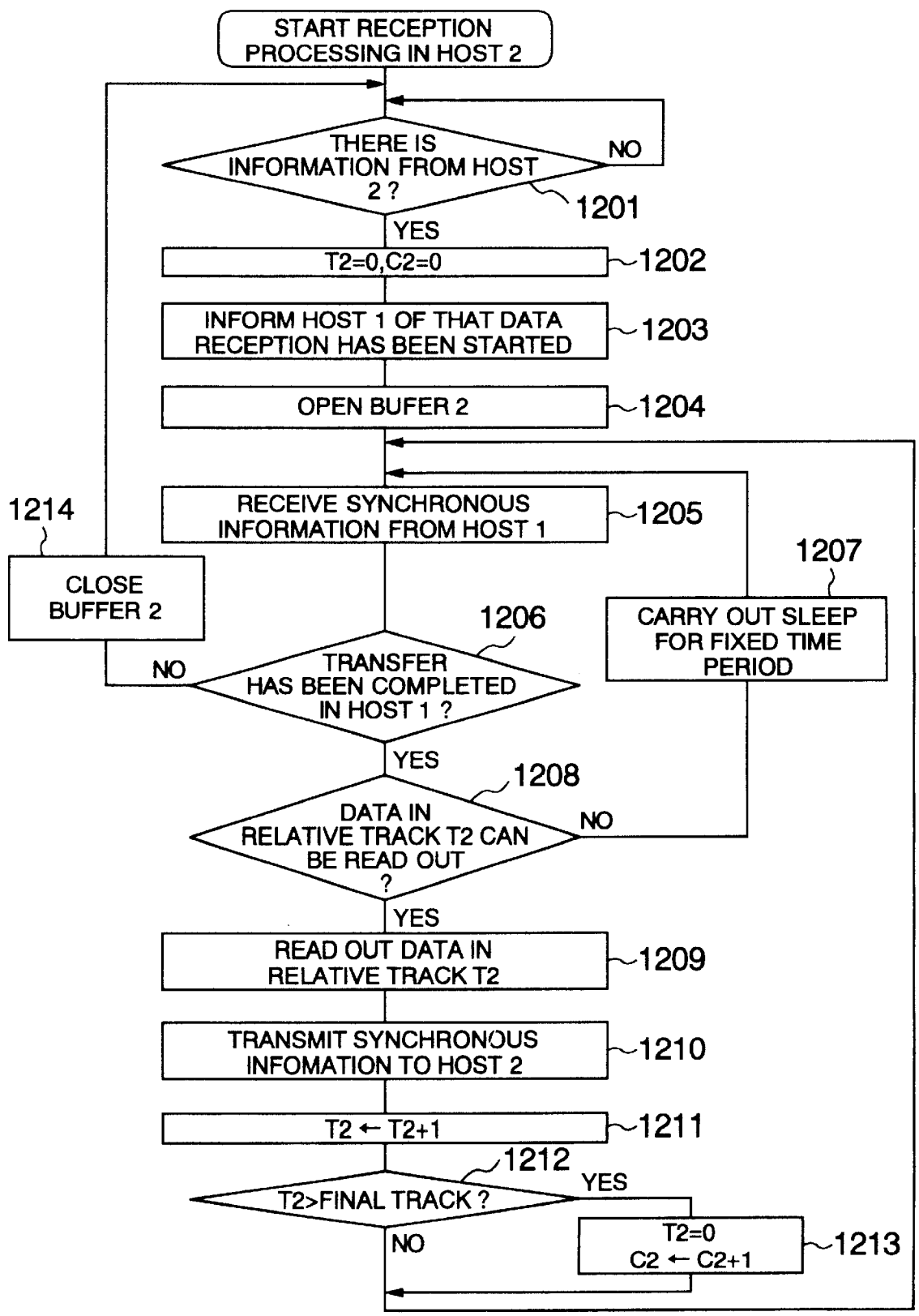
FIG. 12 is a flow chart useful in explaining the processing of receiving data on a host 2 side in the second embodiment.

Next, the description will hereinbelow be given with respect to a second method of transferring the data from the host computer 1 to the host computer 2 with reference to FIG. 11. While in the present embodiment, only the procedure of transferring the data from the host computer 1 to the host computer 2 is described, the data transfer from the host computer 2 to the host computer 1 can also be realized on the basis of the same procedure.

In the present data transfer processing, one dataset is assigned in the host computer 1 and is called BUFFER 2. Buffer 2 is, similarly to BUFFER used in the first embodiment, used as the buffer for storing therein the data to be transferred.

In this case as well, similarly, both of the access programs of the host computers 1 and 2 are used. That is, in the host computer 1, the access program 1014 issues the request of the dataset manipulation to the operating system 13, while in the host computer 2, the file access program 1024 carries out the dataset manipulation through the format conversion program 25. In FIG. 11, first of all, the description will now be given with respect to the flow of the access program 1014 on the host computer 1 side.

The access program 1014 provides three counters T1, C1 and E. The counter T1 stores therein the relative trank to which the transfer data is written, and the counter C1 stores therein the data relating to how many times the transfer data is written to the relative track of interest. In addition, the counter E is the control code. In this connection, when the relation of E=1 is established, it is represented by the counter E that the data transfer has been completed. First of all, the initialization of T1=0, C1=0 and E=0 is carried out (Step 1101). In addition, the host computer 2 holds two counters which are referred to as T2 and C2, respectively. The counter T2 stores therein the relative track from which the transfer data has been read out right therebefore, and the counter C2 stores therein the data relating to how many times the data in the relative track is read out.

Next, the host computer 1 informs the host computer 2 through the network interface 12 that the data transfer will be started (Step 1102). The access program 1024 on the host computer 2 side starts the reception at the time when the information from the host computer 1 has been received. Then, the host computer 1 waits for the response to be returned thereto from the host computer 2 (Step 1103). At the time when the response is returned thereto from the host computer 2, BUFFER 2 is opened (Step 1104) to start the actual data transfer.

In Step 1105, the record for one track is written to the relative track T1 of BUFFER 2. Next, a set of T1, C1 and E (hereinafter, this set is referred to as "synchronous information 1", when applicable) is transmitted to the host computer 2 through the network interface 12 (Step 1106). Subsequently, in Step 1107, a set of T2 and C2 sent from the host computer 2 are received (hereinafter, the set of T2 and C2 are referred to as "synchronous information 2", when applicable), and then it is judged by the host computer 1 whether or not this set can be written to the next block (Step 1108). This judgement is the same as that in the above-mentioned first embodiment. Then, if it is judged in Step 1108 that set can not be written to the next block, then the sleep is carried out for a fixed time period (Step 1109), and then the processing is returned back to Step 1107 in which the synchronous information 2 is read out again. Then, it is judged in Step 1108 whether or not that set can be written to the next block. In this connection, even if the sleep in Step 1109 is not necessarily carried out and alternatively the synchronous information 2 is immediately read out, there is particularly no problem.

If it is judged in Step 1108 that set can be written to the next block, then T1 is incremented by 1 (Step 1110). If T1 exceeds the final track of BUFFER 2 (Step 1111), then T1 is restored to 0 and C1 is incremented by 1 (Step 1112).

In Step 1113, it is judged whether or not the transfer data still remains. If it is judged in Step 1113 that the transfer data still remains, then the processing is returned back to Step 1105 in which the data transfer is carried out. On the other hand, if it is judged in Step 1113 that the transfer data does not remain no longer, then BUFFER 2 is closed (Step 1114), and the host computer 2 is informed through the network interface 12 of that the data transfer has been completed (Step 1115).

Next, the description will hereinbelow be given with respect to the flow of the file access program 1024 on the host computer 2 side.

The file access program 1024 waits for the information from the host computer 1 to be sent thereto, and continues to wait therefor if there is yet no information from the host computer (Step 1201). At the time when receiving the information from the host computer 1, the reception processing on the host computer 2 side is started. Next, in Step 1202, the initialization of T2=0 and C2=0 is carried out. Thereafter, in Step 1203, the host computer 1 is informed through the network interface 22 of that the data reception has been started.

In Step 1204, BUFFER 2 is opened to make preparations for the data reception. In Step 1205, the synchronous information 1 from the host computer 1 is received through the network interface 22. If the data transfer in the host computer 1 has already been completed as a result of checking up the synchronous information 1 from the host computer 1 which has been received by the host computer 2 (Step 1206), then BUFFER 2 is closed (Step 1214) and the reception processing is completed once and then the processing is returned back to Step (1201) in which the host computer 2 waits for the signal representing the start of the data transfer to be sent thereto.

In Step 1208, the synchronous information which has been received from the host computer 1 is checked up to judge whether or not the data in the relative track T2 can be read out. The judgement method is the same as that in the first embodiment. If it is judged in Step 1208 that the data in the relative track T2 can not be read out, then the sleep is carried out for a fixed time period (Step 1207), and then the processing ir returned back to Step 1205 in which the synchronous information 1 is read out again. Thereafter, the judgement in Step 1208 is carried out. In this connection, the sleep in Step 1207 may not be necessarily carried out, and alternatively even if the synchronous information 2 is immediately read out, there is particularly no problem.

On the other hand, if it is judged in Step 1208 that the data in the relative track T2 can be read out, then the record of the relative track T2 is read out for one track (Step 1209). Next, the synchronous information 2 is transmitted to the host computer 1 through the network interface 22 (Step 1210).

Then, in Step 1211, T2 is incremented by 1. If T2 exceeds the final track of the dataset BUFFER 2 (Step 1212), then T2 is restored to 0, and C2 is incremented by 1 (Step 1213).

After that, it is returned to Step 1205, and the processing up to step 1213 is repeatedly carried out.

(3) Third Embodiment

Figure 13:
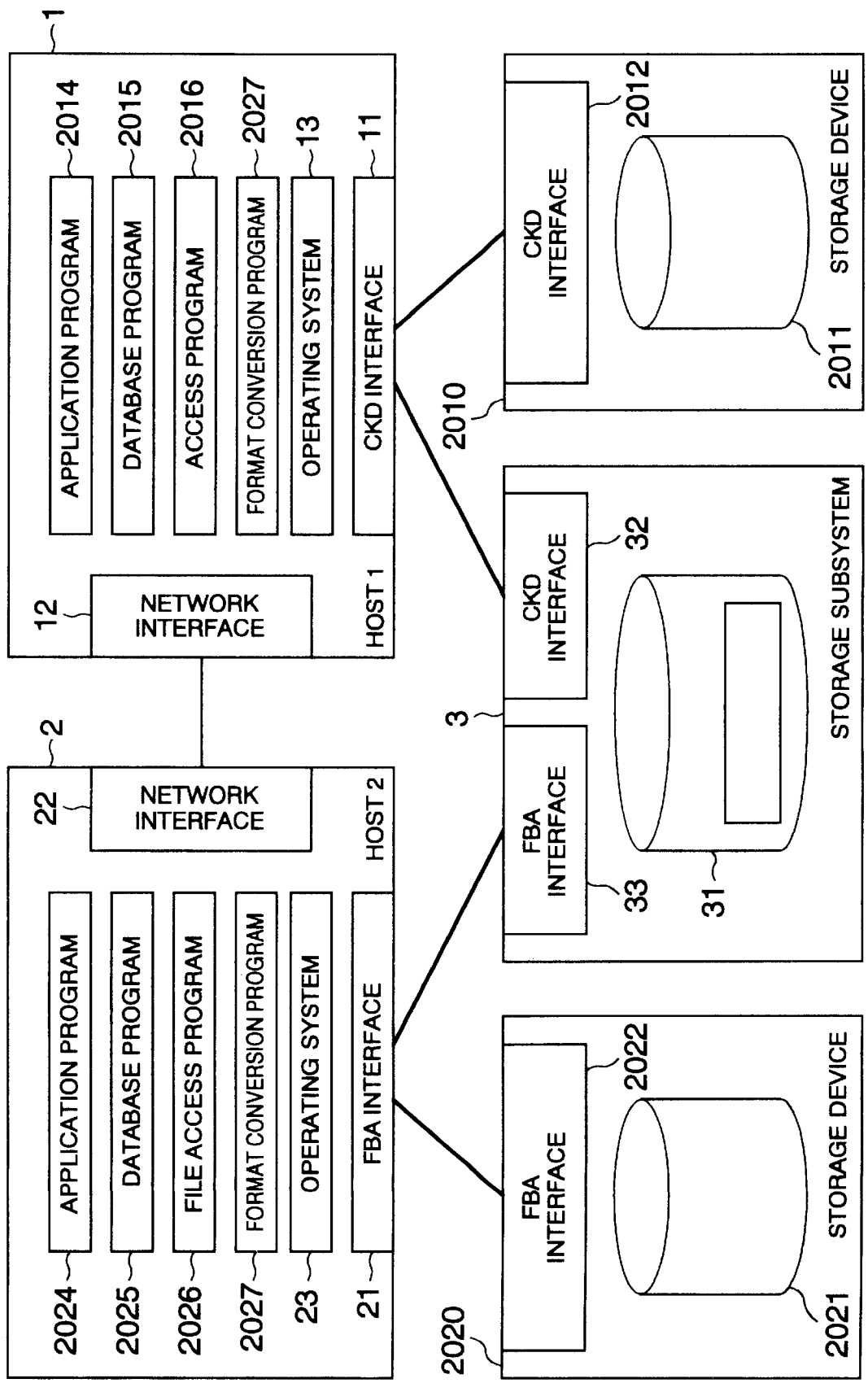
FIG. 13 is a schematic block diagram showing a configuration of a computer system in a third embodiment to which the present invention is applied.

FIG. 13 shows an example of a configuration of a computer system to which the above-mentioned first and second embodiments are applied.

The computer system includes a host computer 1, a host computer 2, a storage subsystem 3 which is connected to both of the host computers 1 and 2, a storage device 2010 which is connected to the host computer 1, and a storage device 2020 which is connected to the host computer 2.

The host computer 1 has the storage device 2010, a count key data interface 11, which is conformed to a count key data format (hereinafter, referred to as "a CKD format" for short, when applicable), as an interface between the host computer 1 and the storage subsystem 3, and a network interface 12 through which the host computers 1 and 2 are connected, and also is controlled by an operating system 13. In addition, an application program 2014, a database program 2015 and an access program 2016 are executed on the operating system 13. In this connection, while in addition thereto, the constituent elements such as a memory and a CPU which are necessarily included in the computer, these elements are not important very so in the description of the present embodiment. Therefore, the description thereof is omitted here for the sake of simplicity.

On the other hand, the host computer 2 has the storage device 2020, an FBA interface 21, which is conformed to a fixed length block format, as an interface for connecting therethrough the host computer 2 to the storage subsystem 3, and a network interface 22 through which the host computers 1 and 2 are connected, and also is controlled by an operating system. In addition, the host computer 2 further includes an application program 2024, a database program 2025, a file access program 2026 and a format conversion program 2027 which are all executed on the operating system 23.

The access program 2016 and the file access program 2026 are the same as the access program 14 and the file access program 24 of the first embodiment, respectively, or are the same as the access program 1014 and the file access program 1024 of the second embodiment, respectively. The format conversion program 2027 is the same as the format conversion program 25 of the first and second embodiments.

Both of the network interfaces 12 and 22 are the interfaces which are conformed to the same data transfer protocol.

The storage subsystem 3 includes a disk 31, a CKD interface 32 through which the storage subsystem 3 is connected to the host computer 1, and an FBA interface 33 through which the storage subsystem 3 is connected to the host computer 2.

The storage device 2010 includes a disk 2011 and a CKD interface 2012 through which the storage device 2010 is connected to the host computer 1, and the data of the storage device 2010 is managed by the database program 2015. On the other hand, the storage device 2020 includes a disk 2021, and an FBA interface 2022 through which the storage device 2020 is connected to the host computer 2 and the data thereof is managed by the database program 2025.

The application program 2014 requests the database program 2015 in order for the application program 2014 to be able to access to the data of the storage devices 2010 and 2020. Likewise, the application program 2024 requests the database program 2025 in order for the application program 2024 to be able to access to the data of the storage devices 2010 and 2020. In the case where the database program 2015 subjects the data in the storage device 2010 to the processing such as the selection, or in the case where the database program 2025 subjects the data in the storage device 2020 to the processing, the database program 2015 or 2025 may access to the storage device 2010 or 2020 through the CKD interface 11 or the FBA interface 21, respectively. This is also applied to the normal database program. On the other hand, in the case where the database program 2015 accesses to the data in the storage device 2020, or in the case where the database program 2025 accesses to the data in the storage device 2010, this processing is realized by carrying out the transfer of the data between the host computers 1 and 2 as have already been described in the first and second embodiments. Now, the description will hereinbelow be given with respect to the case where the data in the storage device 2010 is retrieved as an example of the procedure in which the database program 2025 accesses to the data in the storage device 2010.

The database program 2025 interprets the request from the application program 2024, and when this request is the request of retrieving the data from the storage device 2010, delivers this request to the database program 2015 through the network interface 22. At the same time, the file access program 2026 is activated to make preparations for reception of the data from the host computer 1 side. Since the request received by the database program 2015 is the request of retrieving the data in the storage device 2010, the database program 2015 retrieves successively the necessary data from the storage device 2010 in accordance with the request. At the same time, the access program 2016 is activated, and the database program 2015 delivers the data thus retrieved to the access program 2016 in turn to transfer the data to the host computer 2 side.

The file access program 2026 on the host computer 2 side receives the data synchronously therewith to deliver successively the data thus received to the database program 2025. As a result, the database program 2025 on the host computer 2 side can retrieve the data on the host computer 1 side.

In addition, if the reverse procedure is carried out, then the database program 2015 on the host computer 1 side can retrieve the data on the host computer 2 side.

(4) Fourth Embodiment

Figure 14:
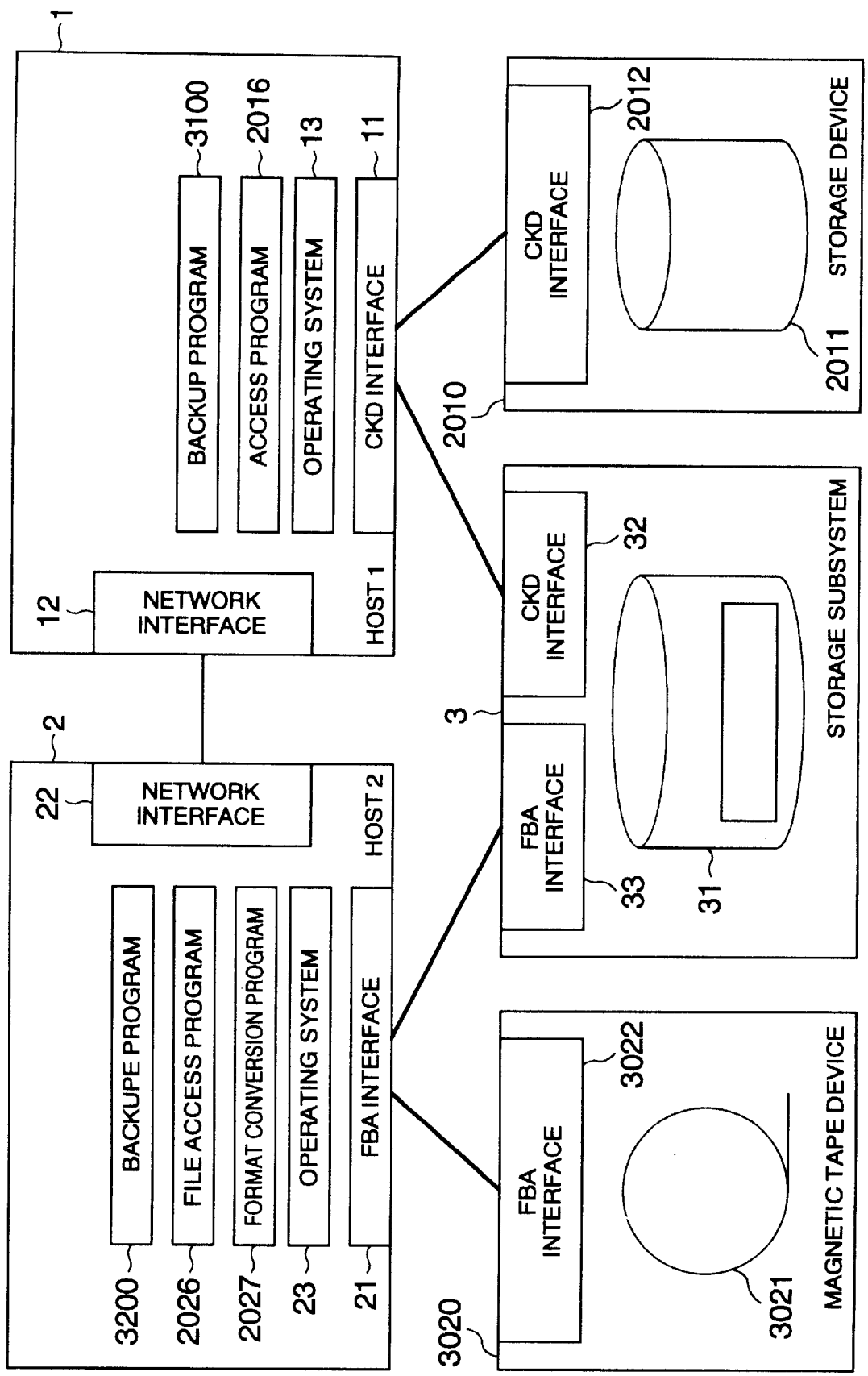
FIG. 14 is a schematic block diagram showing a configuration of a computer system in a fourth embodiment to which the present invention is applied.

Next, a fourth embodiment of the present invention will hereinbelow be described in detail with reference to FIG. 14. FIG. 14 shows a computer system of the fourth embodiment of the present invention.

The computer system includes a host computer 1, a host computer 2, a storage device 2010 which is connected to the host computer 1, a magnetic tape device 3020 which is connected to the host computer 2, and a storage subsystem 3 which is connected to both of the host computers 1 and 2.

The host computer 1 has the storage device 2010, a count key data interface 11, which is conformed to a count key data format (hereinafter, referred to as "a CKD format" for short, when applicable), as an interface between the host computer 1 and the storage subsystem 3, and a network interface 12 through which the host computer 1 is connected to the host computer 2, and also is controlled by an operating system 13. In addition, a backup program 3100 and an access program 2016 are executed on the operating system 13. In this connection, while in addition thereto, the constituent elements such as a memory and a CPU which are necessarily included in the computer, these elements are not important very so in the description of the present embodiment. Therefore, the description thereof is omitted here for the sake of simplicity.

On the other hand, the host computer 2 has the magnetic tape device 3020, an FBA interface 21, which is conformed to a fixed length block format, as an interface for connecting therethrough the host computer 2 to the storage subsystem 3, and a network interface 22 through which the host computer 2 is connected to the host computer 1, and also is controlled by an operating system 23. In addition, the host computer 2 further includes a backup program 3200, a file access program 2026 and a format conversion program 2027 which are all executed on the operating system 23.

The access program 2016 and the file access program 2026 are the same as those of the third embodiment shown in FIG. 13.

Both of the network interfaces 12 and 22 are the interfaces which are conformed to the same data transfer protocol.

The storage subsystem 3 includes a disk 31, a CKD interface 32 through which the storage subsystem 3 is connected to the host computer 1, and an FBA interface 33 through which the storage subsystem 3 is connected to the host computer 2.

The storage device 2010 includes a disk 2011, and a CKD interface 2012 through which the storage device 2010 is connected to the host computer 1, and the magnetic tape device 3020 includes a tape drive 3021 and an FBA interface 3022 through which the storage device 2010 is connected to the host computer 2.

Next, the description will hereinbelow be given with respect to the processing of carrying out the backup of the file in the storage device 2010 of the host computer 1 on the basis of assistance of the magnetic tape device 3020 of the host computer 2 in this computer system.

First of all, the backup program 3100 informs through the network interface 12 the backup program 3200 in the host computer 2 of that the backup of the file in the storage device 2010 is intended to be carried out. Next, the backup program 3100 activates the access program 2016 to deliver successively, while reading out the data in the file as a backup object in the storage device 2010, the data in the file as the backup object in the storage device 2010 to the access program 2016. On reception of the information of the backup from the host computer 1, the backup program 3200 of the host computer 2 activates the file access program 2026 to make preparations for reception of the data from the host computer 1 side.

Then, the file access program 2026 receives the data synchronously with the access program 2016 on the host computer 1 side similarly to the first and second embodiments, and then delivers successively the data thus received to the backup program 3200. Thereafter, the backup program 3200 writes the data thus delivered thereto to the magnetic tape device 3020. By repeating this processing, it is possible to realize backup of the data in the file within the storage device 2010.

While the present invention has been particularly shown and described with reference to the preferred embodiments, it will be understood that the various changes and modifications will occur to those skilled in the art without departing from the scope and true spirit of the invention. The scope of the invention is therefore to be determined solely by the appended claims.

What is claimed is:

1. A data transfer method in a computer system including first and second host computers each having first and second interfaces, said first and second interfaces being separate from each other, a network coupled to said first interface of said first host computer and said first interface of said second host computer, and a storage subsystem coupled to said second interface of said first host computer and said second interface of said second host computer, said method of controlling data transfer comprising the steps of:

writing, by said first host computer through said second interface of said first host computer, data as an object of transfer to said storage subsystem;

sending from said first host computer, through said first interface of said first host computer, said network, and said first interface of said second host computer, to said second host computer a message which includes information about said data as an object of transfer written to said storage subsystem; and reading out, by said second host computer through said second interface of said second host computer, said data as an object of transfer from said storage subsystem after said second host computer receives said message from said first host computer through said first interface of said second host computer.

2. A data transfer control method for use in a computer system according to claim 1, wherein said message includes information about a location of said data as an object of transfer; and wherein said reading out step reads out said data as an object of transfer based on the location of said data as an object of transfer.

3. A data transfer control method for use in a computer system according to claim 1, wherein the step of writing said data to said storage subsystem by said first host computer and the step of reading out the data from said storage subsystem by said second host computer are executed in parallel with each other.

4. A data transfer control method for use in a computer system according to claim 1, wherein said first host computer includes an application program and an operating system, and said operating system converts an access request of a count key data format which is issued from said application program towards said storage subsystem into an access request of a fixed length block format to said storage subsystem in order to carry out the access request thus converted thereinto.

5. A data transfer method of controlling data transfer in a computer system including first and second host computers each having first and second interfaces, said first and second interfaces being separate from each other, a network coupled to said first interface of said first host computer, and said first interface of said second host computer, and a storage subsystem coupled to said second interface of said first host computer and second interface of said second host computer, said data transfer method comprising:

(a) a step for said first host computer of writing, by said first host computer through said second interface of said first host computer, a part of data as an object of transfer into a storage region of said storage subsystem;

(b) a step of said first host computer of notifying termination of the step for writing, from said first host computer through said first interface of said first host computer, said network and said first interface of said second host computer, to said second host computer;

(c) a step for said second host computer, which has been notified of termination of the step for writing, of reading out a part of said data stored in said storage subsystem through said second interface of said second host computer;

(d) a step of writing a part of said read out data into said second host computer; and (e) a step of repeating said steps (a) to (d) until said data transfer is terminated.

6. A data transfer method according to claim 5, wherein said notifying of step (b) includes an information of a part of data written into said storage subsystem by said first host computer.

7. A data transfer method for transferring data according to claim 5, wherein said notifying of step (b) further comprises:

a step for said first host computer of writing a value corresponding to data amount written at a storage region in said storage subsystem into a storage region included in said first host computer; and a step for said second host computer of reading out said written corresponding value.

8. An information processing apparatus, comprising:

a network interface for connecting with another information apparatus;

a storage unit for storing data;

an arithmetic processing unit; and a storage interface for connecting with said storage unit, wherein said network interface and said storage interface are separate from each other, wherein said arithmetic processing unit performs processing of:

transferring data from said information processing apparatus to said storage unit through said storage interface, transferring a signal indicating termination of transferring of said data to said storage unit through said network interface to said another information processing apparatus, and repeating transferring of said data and transferring of said signal indicating termination of transferring of said data until transfer of a predetermined amount of data has been conducted.

9. An information processing apparatus according to claim 8, wherein said signal indicating termination of said transferring of said data includes information concerned with a stored location of said data in said storage unit.

10. An information processing apparatus according to claim 9, wherein said storage interface is an interface corresponding to CKD format.

11. An information processing apparatus according to claim 10, wherein said storage interface is an interface corresponding FBA format.

12. An information processing apparatus, comprising:

a network interface for coupling said information processing apparatus with another information processing apparatus;

a storage unit for recording data;

an arithmetic operation unit; and a storage interface for coupling said information processing apparatus with said storage unit, wherein said network interface and said storage interface are separate from each other, wherein said arithmetic operation unit performs operations of:

(a) receiving a signal from said another information processing apparatus through said network interface, (b) reading data out of said storage unit stored therein by said another information processing apparatus based on said signal received through said network interface, and (d) repeating said steps (a) and (b) until a predetermined amount of data is read out.

13. An information processing apparatus according to claim 12, wherein said signal includes information concerned with location of said data in said storage unit.

14. An information processing apparatus according to claim 13, wherein said storage interface is the interface corresponding to CKD format.

15. A computer program stored in a computer readable storage medium for controlling data transfer from an information processing apparatus to another information processing apparatus each connected to a storage subsystem by a storage interface, and said information processing apparatus being connected to said another information processing apparatus by a network interface which is separate from said storage interface, said computer program when executed causes said information processing apparatus to perform:

(a) a step of transferring data from said information processing apparatus to said storage subsystem through said storage interface;

(b) a step of transferring a signal notifying termination of data transfer to said another information processing apparatus through said network interface; and (c) a step of repeating said steps (a) and (b) until transfer of a predetermined amount of data has been conducted, wherein said signal notifying termination of data transfer includes information concerned with a stored location of said data in said storage subsystem.

16. A computer program stored in a computer readable storage medium for controlling data transfer to an information processing apparatus from another information processing apparatus each connected to a storage subsystem by a storage interface, and said information processing apparatus being connected to said another information processing apparatus by a network interface which is separate from said storage interface, said computer program when executed causes said information processing apparatus to perform:

(a) a step of receiving in said information processing apparatus a predetermined signal from said another information processing apparatus via said network interface notifying said information processing apparatus that said another information processing apparatus has transferred data to said storage subsystem and requesting transfer of said data to said information processing apparatus;

(b) a step of, in response to said predetermined signal, reading said data out of said storage subsystem transferred to said storage subsystem by said another information processing apparatus; and (c) repeating said steps (a) and (b) until transfer of a predetermined amount of data has been conducted, wherein said signal notifying termination of data transfer includes information concerned with a stored location of said data in said storage subsystem, and wherein said storage interface is an interface corresponding to a CKD format.

* * * * *